(12) United States Patent
Shim et al.

(10) Patent No.: US 11,692,569 B2
(45) Date of Patent: Jul. 4, 2023

(54) FASTENER ASSEMBLY

(71) Applicants: HYUNDAI MOTOR COMPANY, Seoul (KR); KIA CORPORATION, Seoul (KR); NIFCO KOREA INC., Asan-si (KR)

(72) Inventors: Jong Woo Shim, Suwon-si (KR); Se Min Moon, Seoul (KR); Kyoung Ho Lee, Seoul (KR); Kwang Ok Jeon, Suwon-si (KR); Sun Joo Kim, Asan-si (KR)

(73) Assignees: HYUNDAI MOTOR COMPANY, Seoul (KR); KIA CORPORATION, Seoul (KR); NIFCO KOREA INC.

( * ) Notice: Subject to any disclaimer, the term of this patent is extended or adjusted under 35 U.S.C. 154(b) by 68 days.

(21) Appl. No.: 17/332,019

(22) Filed: May 27, 2021

(65) Prior Publication Data
US 2022/0025916 A1 Jan. 27, 2022

(30) Foreign Application Priority Data
Jul. 21, 2020 (KR) .......... 10-2020-0090141

(51) Int. Cl.
F16B 21/02 (2006.01)
B60R 13/02 (2006.01)
F16B 5/06 (2006.01)

(52) U.S. Cl.
CPC .......... *F16B 5/065* (2013.01); *B60R 13/0206* (2013.01); *F16B 21/02* (2013.01)

(58) Field of Classification Search
CPC ........ F16B 21/086; F16B 21/02; F16B 5/065; Y10T 24/309; B60R 13/0206
See application file for complete search history.

(56) References Cited

U.S. PATENT DOCUMENTS

| | | | |
|---|---|---|---|
| 2003/0059255 A1* | 3/2003 | Kirchen | F16B 21/02 403/353 |
| 2007/0258795 A1* | 11/2007 | Nakazato | F16B 5/065 411/508 |
| 2018/0186305 A1* | 7/2018 | Kanie | F16B 21/075 |
| 2019/0039824 A1* | 2/2019 | Hsieh | B65D 90/0006 |
| 2021/0123468 A1* | 4/2021 | Leverger | F16B 5/06 |

FOREIGN PATENT DOCUMENTS

KR 2014-0092592 A 7/2014

\* cited by examiner

*Primary Examiner* — Robert Sandy
*Assistant Examiner* — Michael S Lee
(74) *Attorney, Agent, or Firm* — McDonnell Boehnen Hulbert & Berghoff LLP

(57) ABSTRACT

A fastener assembly includes a head unit, a fastening part allowing a lower end of the head unit to be coupled thereto, and a fixing part allowing an upper end of the head unit to be inserted thereinto. The head unit includes a head part inserted into an insertion hole of the fixing part, and a guide part configured to be inserted into a longitudinal hole formed in the fastening part and to be in contact with a rear surface of the fastening part, the guide part being configured to be inserted into the longitudinal hole and be rotated such that the head unit is coupled to the fastening part.

7 Claims, 8 Drawing Sheets

FASTENER ASSEMBLY

CROSS REFERENCE TO RELATED APPLICATIONS

The present application claims priority to Korean Patent Application No. 10-2020-0090141, filed Jul. 21, 2020, the entire contents of which is incorporated herein for all purposes by this reference.

BACKGROUND

Field

The present disclosure relates generally to a fastener assembly. More particularly, the present disclosure relates to a fastener assembly, in which the coupling relation of a head unit to a bracket or a panel located on an upper or lower end of the head unit relative thereto can be maintained, and the coupling and removal of the head unit is easy.

Description of the Related Art

A door trim of a vehicle is attached to the inner surface of a vehicle door, and can protect a passenger from external impact and improve interior aesthetics. In addition, the door trim is formed such that various parts can be mounted thereto for a user's convenience. To mount such a trim to a panel, a fastener bracket is connected to a side of the trim, and a fastener coupled to the fastener bracket in a one-touch manner may be used.

Generally, a fastener assembly structure includes the fastener bracket integrated with or attached to the trim, and the fastener inserted to a side of the fastener bracket. That is, the fastener assembly structure may be configured by inserting the fastener to the fastener bracket.

However, when a force exceeding an insertion force by which the fastener is inserted into the fastener bracket is applied to the fastener, the fastener is easily removed from the fastener bracket.

In addition, in such a conventional trim mounting structure, to mount the fastener to the panel, a hole is formed in the panel made of steel by pressing and thus burrs are in the hole of the panel, and the fastener is damaged by such burrs. When the fastener is attached to and removed from the panel about five times, the fastening force of the fastener is decreased significantly and is required to be replaced.

SUMMARY

Accordingly, the present disclosure has been made keeping in mind the above problems occurring in the related art, and the present disclosure is intended to propose a fastener assembly which includes a head unit supported at four positions thereof such that the fastened state of the head unit is prevented from deteriorating.

Additionally, the present disclosure is intended to propose a fastener assembly, in which the removal of the head unit from a coupling portion of the fastening part to the head unit is prevented and the occurrence of noise at the coupling portion is prevented.

In addition, the present disclosure is intended to propose a fastener assembly from which a fastener is easily attached to and removed.

The objectives of the present disclosure are not limited to the objectives mentioned above, and other objectives of the present disclosure that are not mentioned can be understood by the following description, and can be more clearly understood by the embodiment of the present disclosure. In addition, the objectives of the present disclosure can be realized by means of the claims and combinations thereof.

In order to achieve the above objectives of the present disclosure, a fastener assembly includes the following components.

According to an embodiment of the present disclosure, the fastener assembly includes a head unit, a fastening part allowing a lower end of the head unit to be coupled thereto, and a fixing part allowing an upper end of the head unit to be inserted thereinto, wherein the head unit includes a head part inserted into an insertion hole of the fixing part, and a guide part configured to be inserted into a longitudinal hole formed in the fastening part and to be in contact with a rear surface of the fastening part, wherein the guide part is configured to be inserted into the longitudinal hole and be rotated such that the head unit is coupled to the fastening part.

In addition, the fastener assembly may further include a first support member configured to be located between the head part and the guide part and to overlap an upper surface of the fastening part, and a second support member configured to be located to be adjacent to the first support member and to overlap a lower surface of the fixing part.

Furthermore, the fastener assembly may further include a rib located on the second support member to be in contact with an upper surface of the fastening part.

Additionally, the rib may be configured to be located at each of opposite ends of the longitudinal hole of the fastening part such that the head unit is coupled to the fastening part.

In addition, the head part may be configured to have support points on at least four positions of the head part at which the head part is supported by an inner circumferential surface of the insertion hole.

Furthermore, at least one side surface of side surfaces of the head part may be configured as an elastic piece.

Additionally, the elastic piece may be configured to be located on a side surface of the head part corresponding to the second support member.

The fastener assembly according to the embodiment of the present disclosure can have the following effects due to components to be described later, a combination thereof, and usage relationships thereof.

The fastener assembly of the present disclosure can prevent the removal of the head unit from a coupling portion of the fastening part to the head unit and can prevent the occurrence of noise at the coupling portion, thereby improving the ride comfort of a user.

In addition, the fastener assembly of the present disclosure is attached to and removed from a trim, thereby enabling the trim to be reused.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Figure 1:
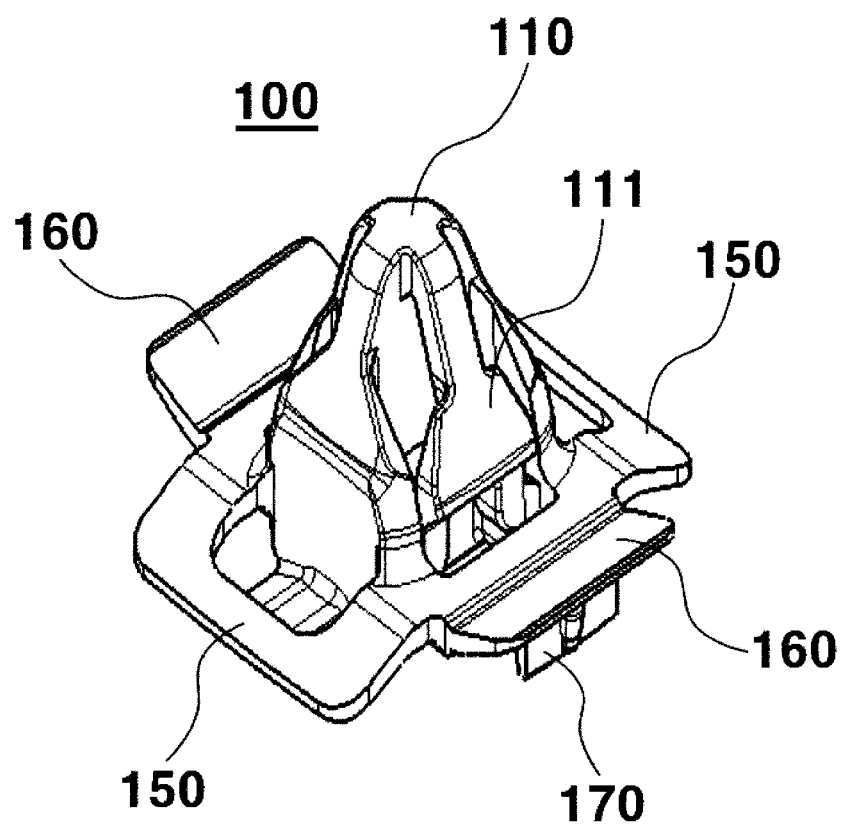
FIG. 1 illustrates a perspective view of a head unit of a fastener assembly according to an embodiment of the present disclosure.
Figure 2:
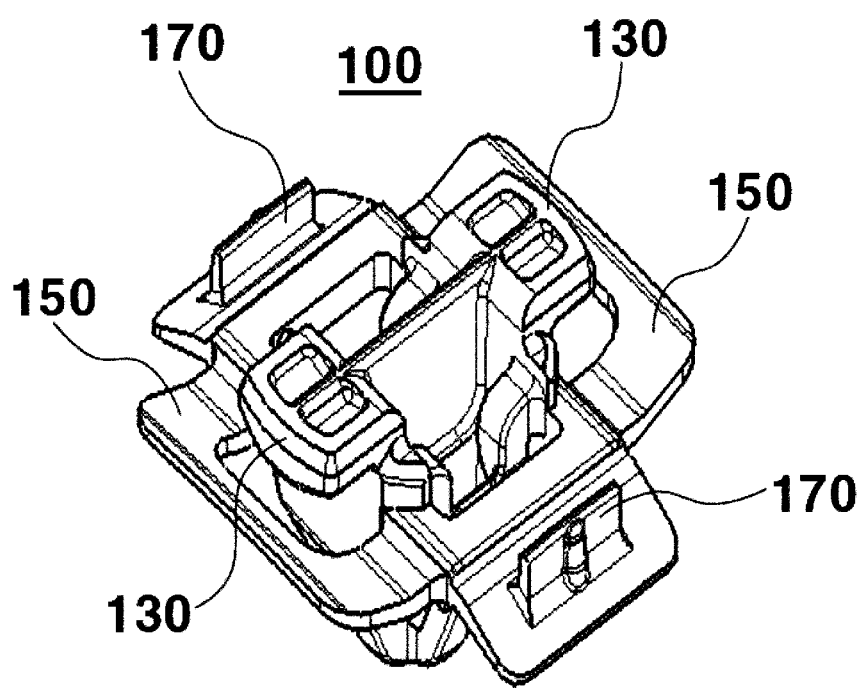
FIG. 2 illustrates a rear view of the head unit of the fastener assembly according to the embodiment of the present disclosure.

Hereinbelow, the embodiment of the present disclosure will be described more in detail with reference to the accompanying drawings. The embodiment of the present disclosure may be variously modified, and the scope of the present disclosure should not be construed as being limited to the following embodiment. The embodiment is provided to more completely explain the present disclosure to those with average knowledge in the art.

In addition, terms such as " . . . part", and " . . . device" described in the specification refer to units that process at least one function or operation, which may be embodied in hardware or software, or in the combination of hardware and software.

Furthermore, in the present specification, order such as first, second, and the like is added to the same names of components to distinguish the components, and the components are not necessarily limited to the order in the following description.

Hereinafter, the embodiment will be described in detail with reference to the accompanying drawings. In the description with reference to the accompanying drawings, the same or corresponding components are assigned the same reference numerals, and duplicate descriptions thereof will be omitted.

The fastener assembly of the present disclosure relates to a fastener coupling structure, and includes a fastening part 200 located on a door trim or a headlining, a head unit 100 configured to be coupled to a surface of the fastening part 200, and a fixing part 300 coupled to a vehicle body by inserting the upper end of a head part 110 of the head unit 100 to the fixing part.

The fastening part 200 may be located between the trim and the head unit 100. Furthermore, the fastening part 200 of the present disclosure may be configured as a fastening bracket. Additionally, the fixing part 300 may be configured as a fixing bracket located between the vehicle body and the head unit 100.

More preferably, in the present disclosure, an interior material such as the door trim or headlining of a vehicle may be referred to as a trim, and the fixing part 300 may include all components that are coupled to the vehicle body.

Hereinafter, the headlining is disclosed as being coupled to a sunroof, but a range to which the fastener coupling structure is applied is not limited thereto.

FIGS. 1 to 4 illustrate the perspective view and rear view of the head unit 100, and the side views of the head unit 100 which include different side surfaces according to the embodiment of the present disclosure.

The head unit 100 includes the head part 110 configured to be inserted into an insertion hole 310 of the fixing part 300, and a guide part 130 configured to be in contact with a surface of the fastening part 200 by being inserted into a longitudinal hole 210 formed in the fastening part 200.

The head part 110 includes a conical lateral shape and a recessed area (an anchor part 120) formed in an area of the head part facing the insertion hole 310 formed in the fixing part 300. Furthermore, the recessed area (the anchor part 120) of the head part 110 is supported by the insertion hole 310 of the fixing part 300 in at least four points of the anchor part. More preferably, the points of the anchor part 120 supported by the insertion hole 310 may be the vertices of the rectangular cross section of the anchor part 120. That is, the anchor part 120 may be in contact with at least the vertices of the inner circumferential surface of the insertion hole 310.

At least two side surfaces corresponding to each other of four side surfaces constituting the head part 110 are constructed as elastic pieces 111, and have elastic force when being inserted into the insertion hole 310 of the fixing part 300. More preferably, in the embodiment of the present disclosure, the side surfaces of the head part 110 on which second support members 160 are located may be the elastic pieces 111. Each of the elastic pieces 111 is configured to contract when the head part 110 is inserted into the insertion hole 310 of the fixing part 300 and to be restored to an initial state thereof when the anchor part 120 and the insertion hole 310 are located to face to each other.

Each elastic piece 111 is configured to be fixed to the highest end of the head part 110 and to an area of the head part on which each of the second support members 160 is located, and is configured to allow tension to be applied to a second end of the elastic piece 111 such that the inserted head part 110 is removed from the insertion hole. More preferably, each elastic piece 111 is configured to be exposed to the lowest end of the head part 110 such that the elastic piece 111 located at a position facing the second support member 160 is introduced to the inner space of the head part 110 by applying tension to the elastic piece.

The guide part 130 configured to be inserted into the longitudinal hole 210 of the fastening part 200 is provided on the second end of the head part 110 facing the insertion hole 310. The guide part 130 is configured to have substantially the same size as the longitudinal hole 210, and a depression 140 is located between the head part 110 and the guide part 130 such that the guide part 130 is inserted into the longitudinal hole 210. The head unit 100 is configured to be rotated after the guide part 130 is inserted into the longitudinal hole 210 of the fastening part 200. The fastening part 200 and the head unit 100 are configured to be coupled to each other after the guide part 130 is rotated to a position substantially perpendicular to the longitudinal hole 210.

When the guide part 130 of the head unit 100 is rotated in the position perpendicular to the length direction of the longitudinal hole 210 of the fastening part 200, a first support member 150 located between the head part 110 and the guide part 130 may overlap the upper surface of the fastening part 200. Furthermore, a rib 170 located on the second support member 160 such that the rib is in contact with the upper surface of the fastening part 200 is configured to be inserted into the longitudinal hole 210, such that the head unit 100 is coupled to the fastening part 200.

When separating the head unit 100 from the fastening part 200, the second support member 160 is moved in an upward direction, and the rib 170 may be located to be released from the longitudinal hole 210. The guide part 130 is configured to be rotated to the position at which the guide part corresponds to the longitudinal hole 210 such that the head unit 100 is removed from the fastening part 200. Accordingly, without the risk of damage, the fastener assembly of the present disclosure allows the coupling of the head unit 100 to the fastening part 200 to be released.

Figure 3:
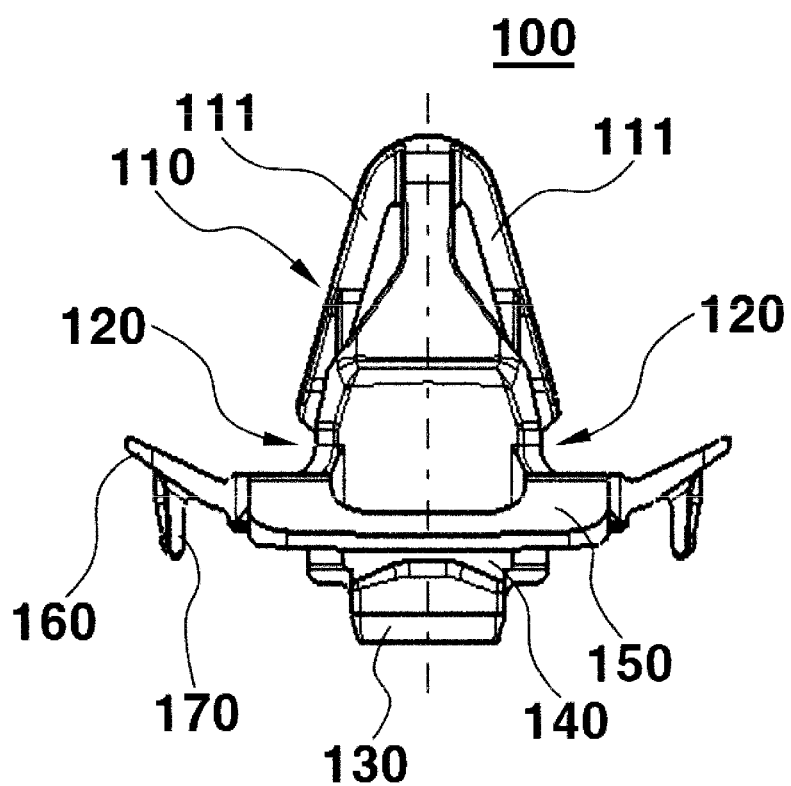
FIG. 3 illustrates a first side view of the head unit of the fastener assembly according to the embodiment of the present disclosure.
Figure 4:
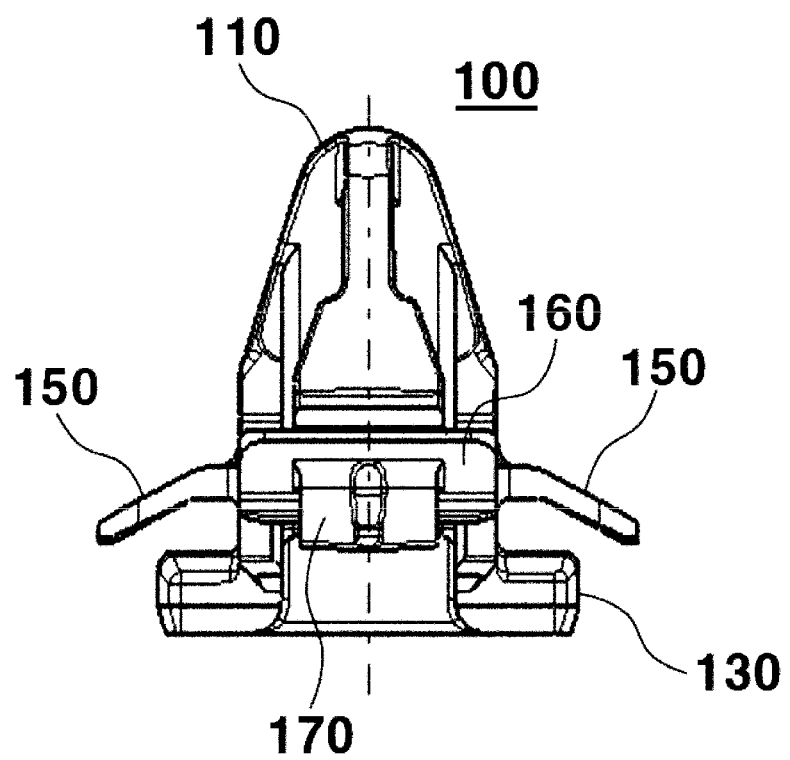
FIG. 4 illustrates a second side view of the head unit of the fastener assembly according to the embodiment of the present disclosure.

FIG. 3 illustrates a side view of the head unit 100 when the second support member 160 is located on each of the opposite sides of the head part, and FIG. 4 illustrates a side view of the head unit 100 when the first support member 150 is located on each of the opposite side surfaces of the head part.

As illustrated in FIG. 3, the first support member 150 is located on each of the opposite side surfaces of the head part 110 corresponding to each other relative to the head part 110, and the second support member 160 is formed at a position adjacent to the first support member 150 and at each position corresponding to each other relative to the head part 110. More preferably, as the first support member 150 goes away from the coupled area of the head part 110, the first support member 150 is configured to incline in a direction being in contact with the fastening part 200. As the second support member 160 goes away from the coupled area of the head part 110, the second support member 160 is configured to incline in a direction being in contact with the fixing part 300. The rib 170 is configured to be located on the second support member 160 and to incline relative to the second support member 160 such that an end of the rib is located at a position adjacent to the fastening part 200. More preferably, in the embodiment of the present disclosure, the guide part 130 may be configured to be formed in the length directions of the first support members 150 located to be symmetrical to each other.

In the embodiment of the present disclosure, in the state in which the head unit 100, the fastening part 200, and the fixing part 300 are coupled to each other, the first support member 150 overlaps the fastening part 200 in the vertical direction, and the second support member 160 overlaps the fixing part 300 in the vertical direction, so that the movement and vibration of the vertical direction of the fastener assembly can be prevented.

Figure 5A:
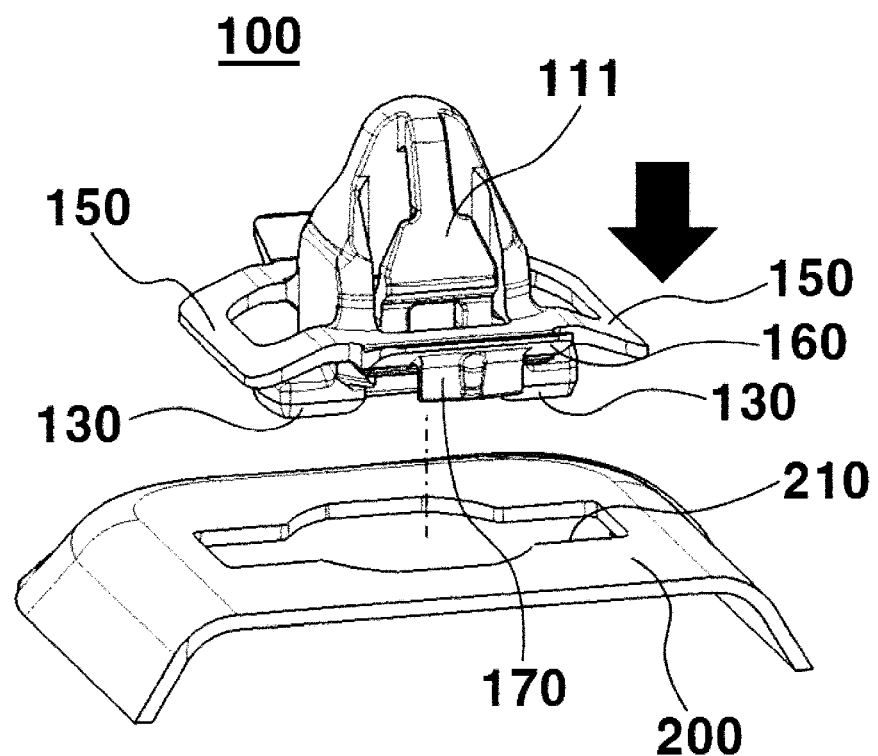
FIG. 5A illustrates the head unit of the fastener assembly and a fastening part according to the embodiment of the present disclosure.
Figure 5B:
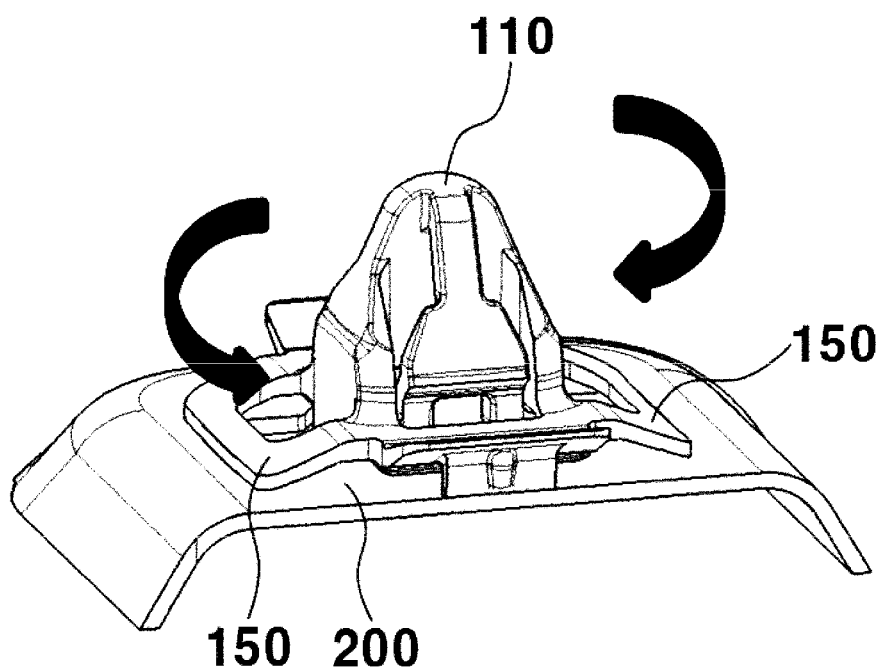
FIG. 5B illustrates the coupling relation between the head unit of the fastener assembly and the fastening part according to the embodiment of the present disclosure.
Figure 5C:
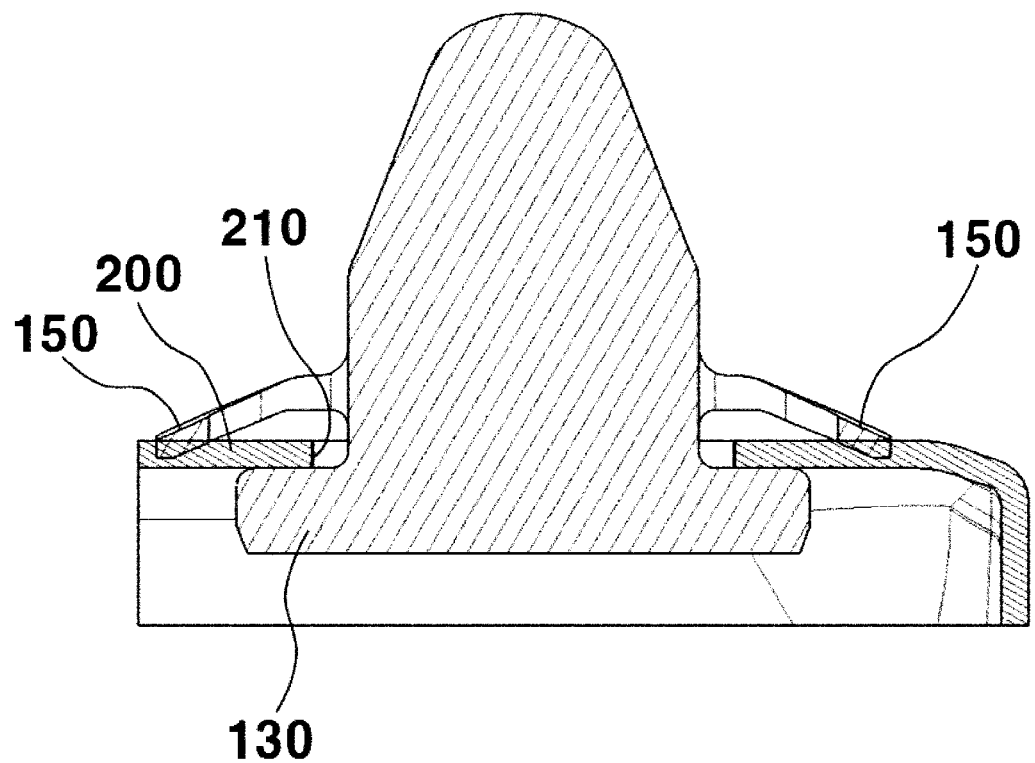
FIG. 5C illustrates a side sectional view of the coupling relation between the head unit of the fastener assembly and the fastening part according to the embodiment of the present disclosure.

FIGS. 5A and 5B illustrate a coupling relation between the fastening part 200 and the head unit 100, and FIG. 5C illustrates a side sectional view of a state in which the head unit 100 is coupled to the fastening part 200.

The guide part 130 located on the second end of the head unit 100 is configured to correspond to the longitudinal hole 210 of the fastening part 200. The guide part 130 is configured to have substantially the same length as the length of the longitudinal hole 210, such that the guide part is inserted into the longitudinal hole 210. The inserted guide part 130 is configured to be rotated 90 degrees relative to the longitudinal hole 210, and the rib 170 located on the second support member 160 is configured to be inserted into the longitudinal hole 210 such that the rotational movements of the fastening part 200 and the head unit 100 are limited.

In an embodiment of the present disclosure, the first support member 150 and the fastening part 200 are configured to overlap each other in a vertical direction so as to prevent the occurrence of a gap between the fastening part 200 and the head unit 100 when the head unit 100 is rotated 90 degrees after the guide part 130 is inserted into the longitudinal hole 210. Furthermore, the rib 170 is configured to be located at the position perpendicular to the horizontal direction of the longitudinal hole 210 when the guide part 130 is inserted into the longitudinal hole 210. The rib 170 is configured such that an end of the rib is inserted into the longitudinal hole 210 to limit an additional rotation of the head unit 100 when the head unit 100 is rotated 90 degrees relative to the length direction of the longitudinal hole 210.

As illustrated in FIG. 5A, the guide part 130 is configured to be inserted into the longitudinal hole 210 formed in the same direction as the direction of the head unit 100 on which the first support member 150 is located. As illustrated in FIG. 5B, the inserted head unit 100 is configured to be rotated 90 degrees in any one direction of opposite directions, and the head unit 100 is configured such that the second support member 160 is rotated to a position corresponding to the length direction of the longitudinal hole 210. Accordingly, the rib 170 located on the second support member 160 is configured such that at least a portion of the rib is inserted into the longitudinal hole 210 to limit the additional rotation of the head unit 100.

When the guide part 130 is rotated relative to the longitudinal hole 210 of the fastening part 200, the upper surface of the guide part 130 is located to be in contact with the rear surface of the fastening part 200. Furthermore, the first support member 150 may be configured to overlap the upper surface of the fastening part 200 in the height direction such that a support force in the height direction is applied between the first support member 150 and the fastening part 200.

In addition, to limit the amount of the rotation of the head unit 100, when the head unit 100 is rotated 90 degrees relative to the longitudinal hole 210, the rib 170 of the second support member 160 is configured to be inserted into the longitudinal hole 210.

In conclusion, the head unit 100 and the fastening part 200 are configured to allow a coupling force to be applied therebetween by the first support member 150 and the second support member 160, whereby the trim and the fastener can be coupled to each other to prevent the occurrence of vibration and noise due to space defined between the trim and the fastener.

Figure 6:
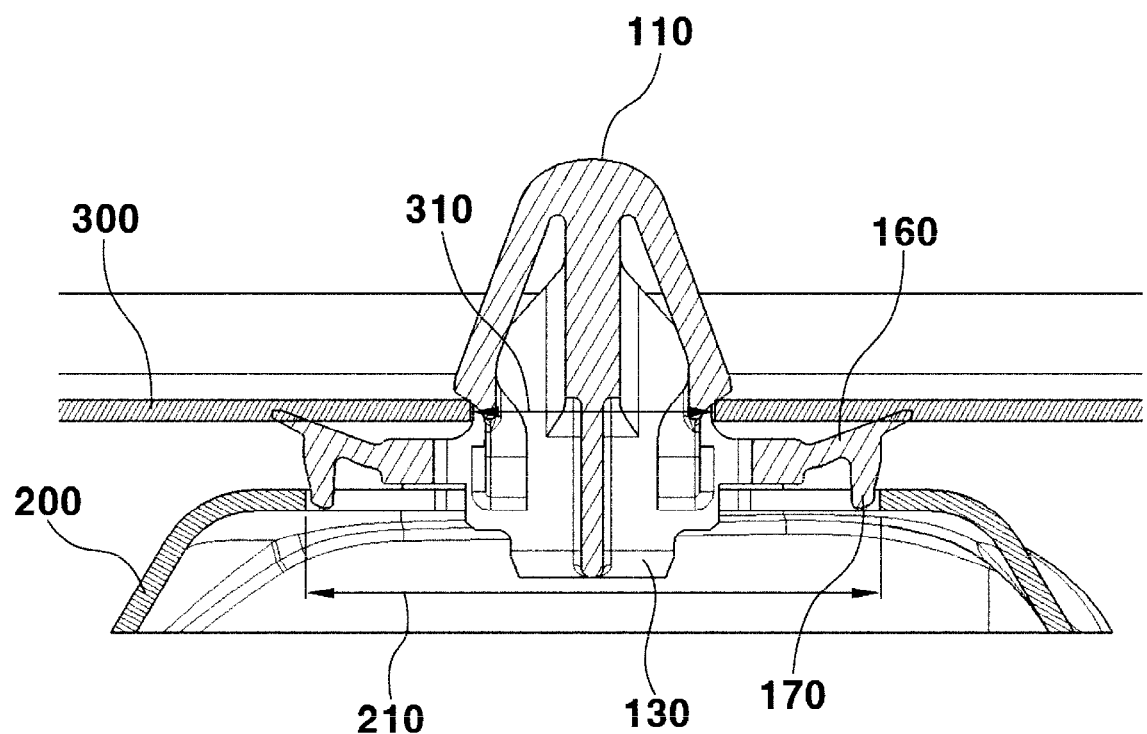
FIG. 6 illustrates a side sectional view of the configuration of the fastener assembly coupled according to the embodiment of the present disclosure.

FIG. 6 illustrates a side sectional view of a state in which the head part 110 of the head unit 100 coupled to the fastening part 200 is inserted into the insertion hole 310 of the fixing part 300 and is coupled to the fixing part according to the embodiment of the present disclosure.

In the state in which the head unit 100 is coupled to the fastening part 200, the head part 110 is configured to be inserted into the insertion hole 310 of the fixing part 300 connected to the vehicle body such that the trim is coupled to the vehicle body. More preferably, the fastening part 200 is configured to be coupled to the headlining, and the fixing part 300 may be configured as a bracket including at least a portion of a sunroof or as a separate bracket fixed to the bracket of the sunroof.

The head part 110 is inserted into the insertion hole 310 formed in the fixing part 300, and the anchor part 120 located on the lower end of the head part 110 is located to face the inner circumferential surface of the insertion hole 310 such that the head unit 100 is coupled to the fixing part 300.

More preferably, the side surfaces of the head part 110 inserted into the insertion hole 310 includes the elastic piece 111 composed of at least one elastic piece. The elastic piece 111 is configured in such a manner that the first end of the elastic piece is coupled to the upper end of the head part 110 such that the elastic piece 111 is inserted to the inner space of the head part 110 and is restored to the initial state of the elastic piece. Accordingly, the insertion hole 310 has the shape of a hole smaller than the hole of the cross section of the head part 110 including the elastic piece 111. When the anchor part 120 is in contact with the inner circumferential surface of the insertion hole 310 after the head part 110 is inserted into the insertion hole 310 by compressing the elastic piece 111, the elastic piece 111 is configured to be restored to the initial state thereof. Furthermore, the head part 110 is inserted into the insertion hole 310, and the second support member 160 is located to be in contact with the rear surface of the fixing part 300.

In addition, the second support member 160 is configured to overlap the rear surface of the fixing part 300 in the height direction. In the state in which the head part 110 is inserted into the insertion hole 310, the fixing part 300 and the second support member 160 are configured such that a predetermined tension is applied thereto in a direction in which the fixing part 300 and the second support member 160 are getting away from each other. Accordingly, the head unit 100 and the fixing part 300 are configured to maintain the coupled state thereof.

The detailed description above is illustrative of the fastener of the present disclosure. In addition, the above description illustrates and describes the exemplary embodiment of the present disclosure, and the components of the fastener of the present disclosure may be variously combined and modified to be used in various environments. That is, changes or modifications may be made within the scope of the concept of the present disclosure disclosed in the present specification, and within a scope equivalent to the disclosed content and/or the scope of the skill or knowledge of the art. The described embodiment describes the best mode for realizing the technical spirit of the present disclosure, and various changes required in the specific application fields and uses of the fastener of the present disclosure are possible. Accordingly, the detailed description of the present disclosure is not intended to be limited to the disclosed embodiment. In addition, the scope of the appended claims should be construed as including other embodiments.

The invention claimed is:

1. A fastener assembly comprising:
   a head unit for fixing a trim, the head unit including an upper end and a lower end;
   a fastening part having a longitudinal hole and a rear surface, wherein the lower end of the head unit is coupled to the fastening part; and
   a fixing part having an insertion hole, wherein the upper end of the head unit is configured to be inserted into the insertion hole of the fixing part,
   wherein the head unit further comprises:
      a head part inserted into the insertion hole of the fixing part; and
      a guide part configured to be inserted into the longitudinal hole formed in the fastening part, and to be in contact with the rear surface of the fastening part,
   wherein the guide part is configured to be inserted into the longitudinal hole, and be rotated such that the head unit is coupled to the fastening part;
   further comprising:
   a second support member configured to overlap with a lower surface of the fixing part; and
   a rib located on the second support member configured to be in contact with an upper surface of the fastening part;
   wherein at least one side surface of the head part is an elastic piece.

2. The fastener assembly of claim 1, further comprising:
   a first support member configured to be positioned between the head part and the guide part, and to overlap an upper surface of the fastening part; and
   the second support member configured to be positioned adjacent to the first support member.

3. The fastener assembly of claim 1, wherein the rib is configured to be positioned at each of opposite ends of the longitudinal hole of the fastening part such that the head unit is coupled to the fastening part.

4. The fastener assembly of claim 1, wherein the head part includes at least four positions, each having a support point at which the head part is supported by an inner circumferential surface of the insertion hole.

5. The fastener assembly of claim 1, wherein the elastic piece is positioned on a side surface of the head part corresponding to the second support member.

6. The fastener assembly of claim 1, wherein the fastening part comprises a fastening bracket connected to the trim.

7. The fastener assembly of claim 1, wherein the fixing part comprises a fixing bracket connected to a vehicle body.

* * * * *